UNITED STATES PATENT OFFICE.

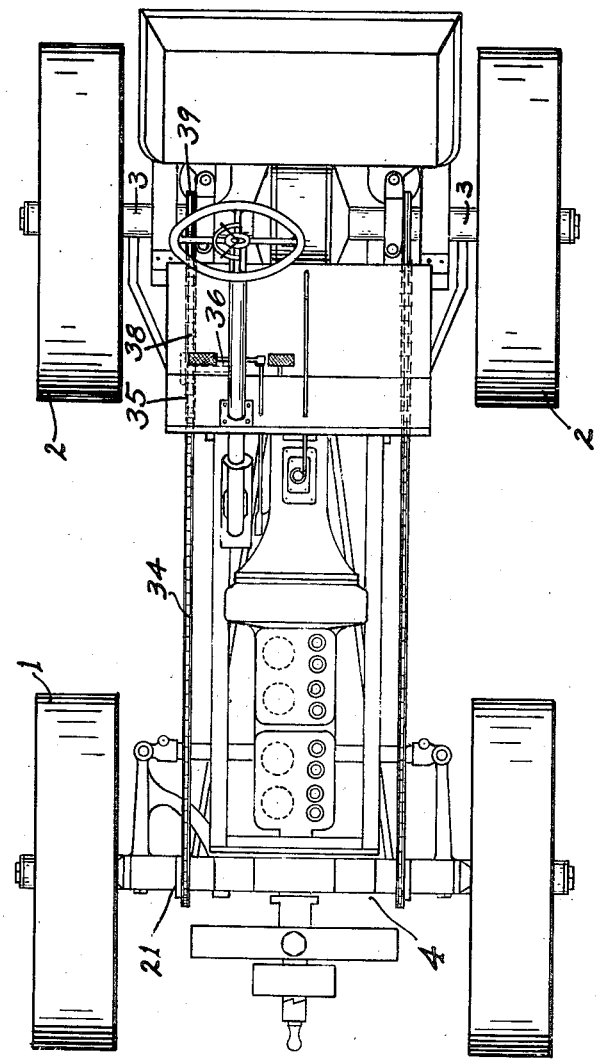

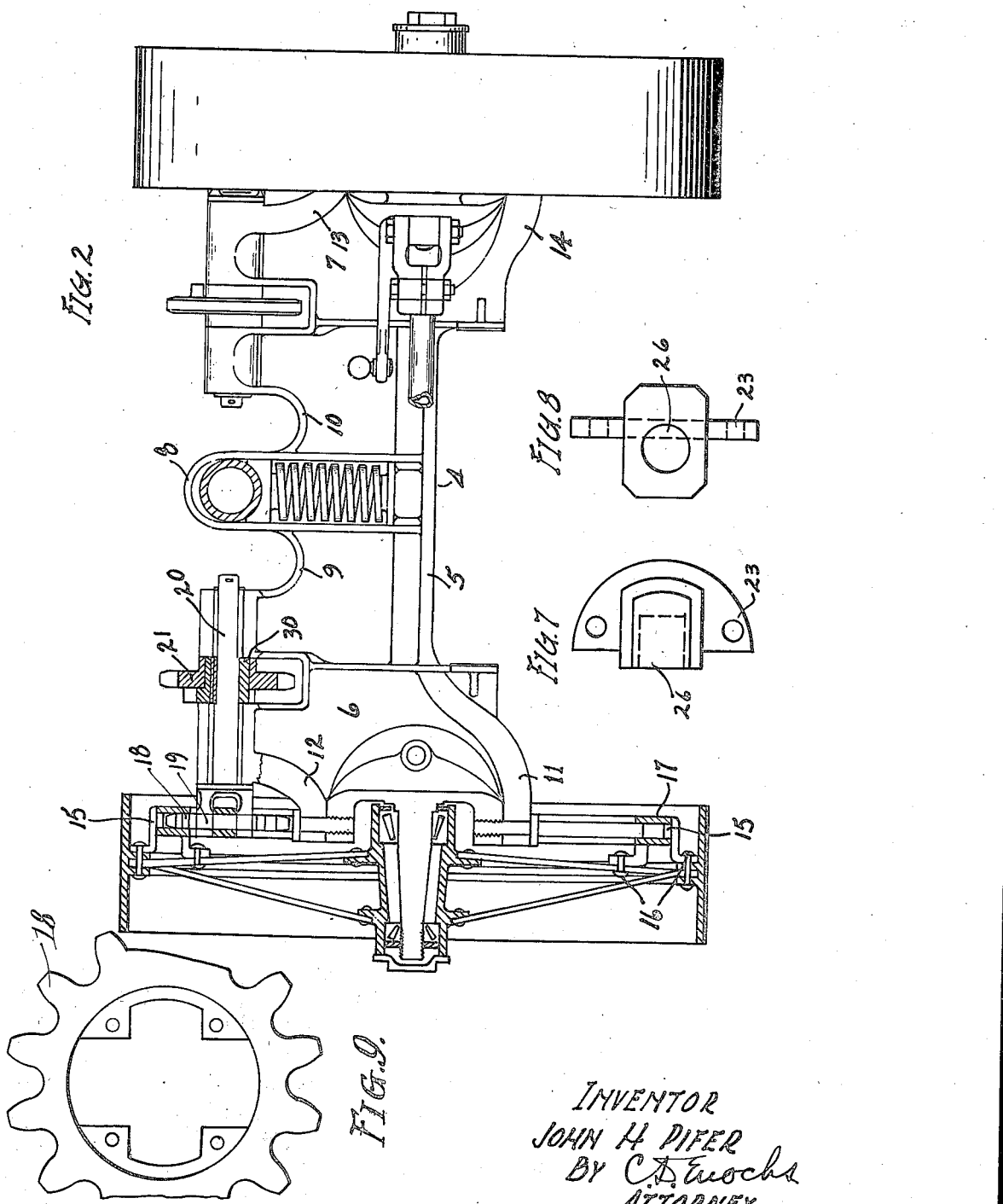

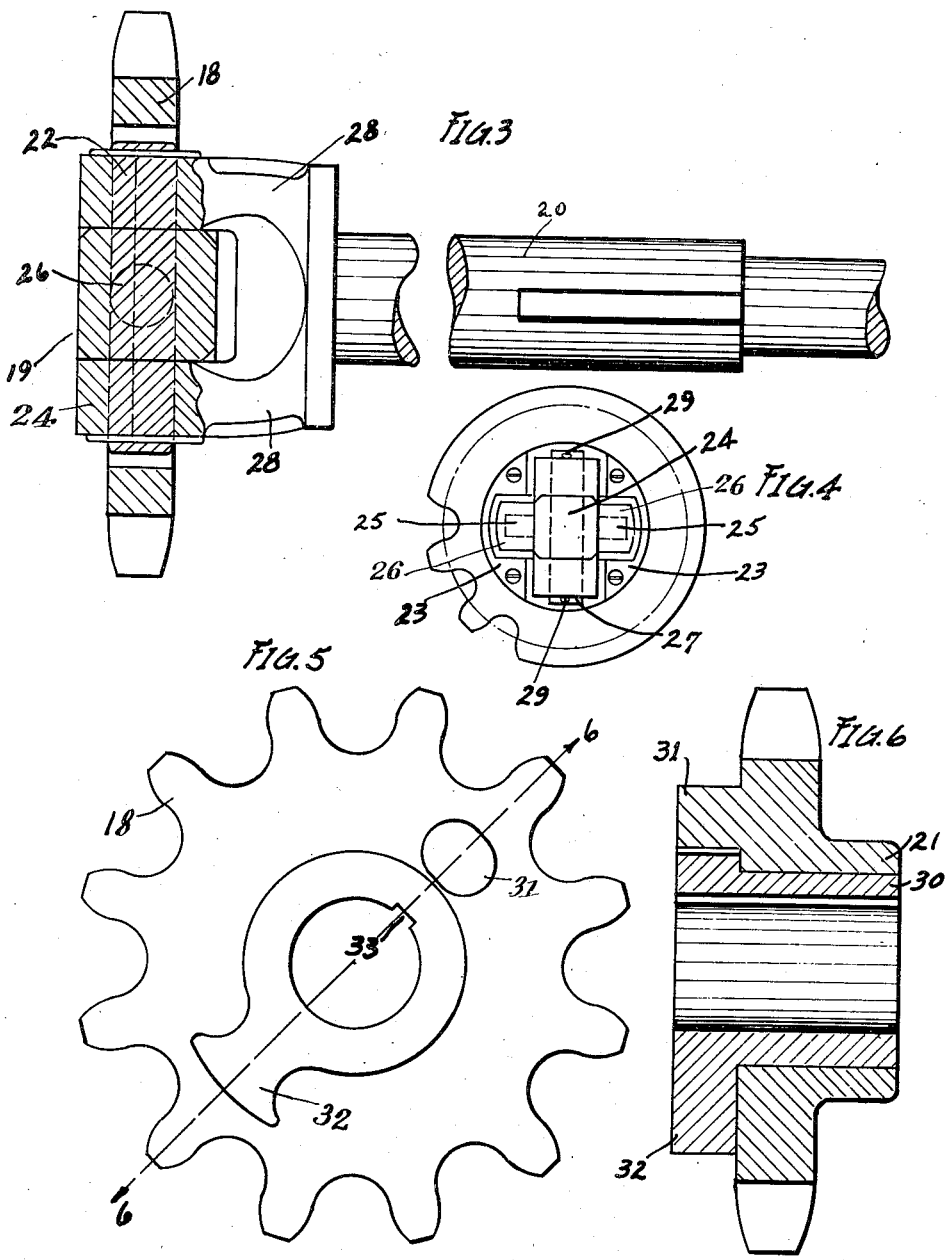

JOHN H. PIFER, OF LARIMORE, NORTH DAKOTA.

DRIVE FOR STEERABLE TRACTOR WHEELS.

1,421,024. Specification of Letters Patent. Patented June 27, 1922.

Application filed September 26, 1921. Serial No. 503,992.

*To all whom it may concern:*

Be it known that I, JOHN H. PIFER, a citizen of the United States, and a resident of Larimore, in the county of Grand Forks and State of North Dakota, have invented certain new and useful Improvements in Drives for Steerable Tractor Wheels, of which the following is a specification.

One object of my invention is to provide, in a device of the class described, improved means for allowing the steerable wheel to run ahead of the driving power.

Another object of my invention is to provide, in a device of the class described, an improved means for driving the steering wheels of a four-wheel drive truck or tractor, whereby a certain amount of slippage is allowed, so that corners may be turned, but this slippage is a predetermined amount so that the drive is eventually positive, either in a forward or reverse direction.

Another object of my invention is to provide, in a device of the class described, an improved construction for the driving member.

With these and incidental objects in view, the invention consists of certain novel features of construction and combination of parts, the essential features of which are hereinafter described with reference to the drawings which accompany and form a part of this specification.

In the drawings, Fig. 1 is a plan view of a four-wheel drive tractor, embodying my invention. Fig. 2 is a view of the front axle, showing one of the steerable wheels in section. Fig. 3 is an enlarged detail, partly in section, of the driving sprocket. Fig. 4 is a view of the driving sprocket and universal joint, taken on its axis of rotation. Fig. 5 is an enlarged detail of the sprocket and driving dog. Fig. 6 is a section taken on the line 6—6, Fig. 5. Fig. 7 is a detail of one of the yokes used to form the universal joint, and Fig. 8 is a view of the same yoke, taken at right angles to that shown in Fig. 7. Fig. 9 is a fragmentary side elevation of the sprocket wheel disassembled from the universal joint, to better show its construction.

The tractor shown in Fig. 1 has two power driven front wheels 1, and two power driven rear wheels 2, the rear wheels being driven by suitable mechanism through the axles 5.

The front axle 4, Figs. 1 and 2, is preferably cast as a unit having the lower transverse member 5 and heads 6 and 7 tied to the upstanding pillow block support 8 by webs 9 and 10.

Projecting from the heads 6 and 7, the ends 11 and 12, and 13 and 14, respectively, form yokes to support the steerable wheels, the wheel supported by the ends 11 and 12 being mounted for horizontal rotation about the line 15—15.

Carried by the wheel at 16 is an internal gear 17 meshing with, and driven by, the sprocket 18.

It is to be understood that both of the front wheels are similar in construction and operation, and the description will be followed through for the one shown in section, and, as shown in Fig. 2, the sprocket 18 is driven through a universal joint 19 by the shaft 20, which, in turn, is driven by the sprocket 21 through a driving dog to be hereinafter described.

Looking at the sprocket 18 and universal joint 19, Figs. 3, 4, 7 and 8, it will be seen that the sprocket wheel is bored out so as to form a shoulder along the line 22, and the yokes 23 are bolted thereto.

A cross head 24 has formed integral therewith stub shafts 25 adapted to journal in sockets 26, carried by the yokes 23, and are placed in position therewith before these yokes are mounted on the sprocket wheel.

A pin 27, passing through the cross head 24, engages with the arms 28 of the yoke carried by the shaft 20, cotter pins 29 retaining the pin 27 in position therewith.

It will be seen, looking at Fig. 3, that by this simple, yet positive, construction, I am able to obtain a form of universal joint of an exceptional wearing quality and sturdy in construction, that will have its line of universal movement in the plane of the sprocket wheel on which it is mounted.

The sprocket wheel 21, Figs. 2, 5 and 6, is journalled on the bushing 30 and has a pin 31 projecting therefrom, adapted to be engaged and driven by the dog 32 carried by the bushing 30, and the bushing is keyed to the shaft 20 at 33.

It is evident that this construction causes the shaft 20, and hence the sprocket 18, to be driven by the sprocket 21 through the engagement of the pin 31 and the dog 32, and that this drive is positive.

It is also seen that, if the tractor is turned to the left so the right hand wheel is running faster than its source of power, then the shaft 20 will be rotating faster than the sprocket wheel 21, and the dog 32 will move away from the pin 31.

While the dog 32 could not make a full revolution, it can travel about 345 degrees, which is more than sufficient to make the turn of 180 degrees, which is all that is required for ordinary driving service, as the dog and pin will, ordinarily, be positively engaged, one with the other.

The sprocket 21 is driven by the chain 34, Fig. 1, this chain being driven by a sprocket 35 driven by a jack shaft 36, driven by the engine through any suitable instrumentality.

The wheel 2, on the same side, is driven by chain 38 and sprocket 39 from the jack shaft 36, so that the front and rear wheels are driven by the same jack shaft, and the differential action occurs not only between the front wheels, but also between front and rear wheels.

While I have described my invention and illustrated it in one particular design, I do not wish it understood that I limit myself to this construction, as it is evident that the application of the invention may be varied in many ways within the scope of the following claim:

Claim:

In a drive for steerable tractor wheels, the combination of a sprocket wheel having its center bored out on one side to an annular flange, two similar yokes bolted to said flange, each of said yokes having a socket therein, a cross head having trunnion pins journalled, one in each of said yokes, a fork headed shaft having a pin joining the fork thereof to said cross head, forming, with said yokes, a universal joint, both of whose axes lie in the plane of said sprocket wheel, a sleeve keyed to said shaft and having a dog thereon, a second sprocket wheel journalled on said sleeve and having a pin thereon adapted to drive said dog from either direction, but having free rotative movement therewith throughout substantially 345 degrees.

JOHN H. PIFER.